US008374116B2

(12) United States Patent
Kitchin

(10) Patent No.: US 8,374,116 B2
(45) Date of Patent: *Feb. 12, 2013

(54) METHOD AND APPARATUS TO ESTABLISH COMMUNICATION WITH WIRELESS COMMUNICATION NETWORKS

(75) Inventor: Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 595 days.

This patent is subject to a terminal disclaimer.

(21) Appl. No.: 12/565,505

(22) Filed: Sep. 23, 2009

(65) Prior Publication Data

US 2010/0015929 A1    Jan. 21, 2010

Related U.S. Application Data

(63) Continuation of application No. 10/327,679, filed on Dec. 24, 2002, now Pat. No. 7,613,160.

(51) Int. Cl.
*H04J 3/08* (2006.01)
*H04W 4/00* (2009.01)
(52) U.S. Cl. .................... 370/315; 370/328; 370/338
(58) Field of Classification Search .................... None
See application file for complete search history.

(56) References Cited

U.S. PATENT DOCUMENTS

| 7,245,724 B1 * | 7/2007 | Chesson et al. | 380/270 |
| 2003/0053437 A1 * | 3/2003 | Bahl et al. | 370/345 |
| 2003/0054818 A1 * | 3/2003 | Bahl et al. | 455/432 |
| 2003/0058832 A1 * | 3/2003 | Knauerhase et al. | 370/349 |
| 2004/0105412 A1 * | 6/2004 | He et al. | 370/338 |

* cited by examiner

*Primary Examiner* — Steven H Nguyen
(74) *Attorney, Agent, or Firm* — Cool Patent, P.C.

(57) ABSTRACT

Briefly, a method of transmitting over a first wireless network a message not addressed to mobile units of the first wireless network, wherein receiving said message causes transmitting stations of the first wireless station to cease transmissions for a predetermined time interval and to enable the access point to be in communication with mobile units or access points of a second wireless network.

6 Claims, 1 Drawing Sheet

METHOD AND APPARATUS TO ESTABLISH COMMUNICATION WITH WIRELESS COMMUNICATION NETWORKS

PRIOR APPLICATION DATA

The present application is a continuation of prior application Ser. No. 10/327,679, filed Dec. 24, 2002 now U.S. Pat. No. 7,613,160, incorporated herein by reference in its entirety.

BACKGROUND OF THE INVENTION

Modern wireless communication systems such as, for example, wireless local area network (WLAN) communication systems, may include at least one type of device, for example, a mobile unit (MU) and/or an access point (AP). The physical layer of WLAN components may operate in a frequency band assigned to WLAN devices, for example, one of the 2.4 Giga Hertz (GHz) or 5 GHz frequency bands. Thus, an MU or AP that operates in the 2.4 GHz frequency band may not be able to communicate with a MU or an AP that operates in the 5 GHz frequency band.

For example, a personal computer (PC) which may be configured to operate as either an AP or, MU for both 2.4 GHz and 5 GHz bands may include a dual band network interface card (NIC) able to transmit and receive communications only with one frequency band at a time. In one example, in which the PC may be configured to be an AP operating in both the 2.4 GHz and 5 GHz bands, MUs operating in the 2.4 GHz band may not receive service from the AP when the AP is in communication with MUs operating in the 5 GHz frequency band, and vice-versa. In another example, there may be a gateway device incorporating a WLAN AP, for example operating in the 2.4 GHz band, with the PC configured to operate as an AP in the 5 GHz band. In this system configuration, devices operating in the 5 GHz band may not be able to communicate with the gateway and/or with devices operating in the 2.4 GHz band, and vice-versa.

Thus, there is a need to mitigate the above-described disadvantages of dual-band and/or multi-band operation of a wireless network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
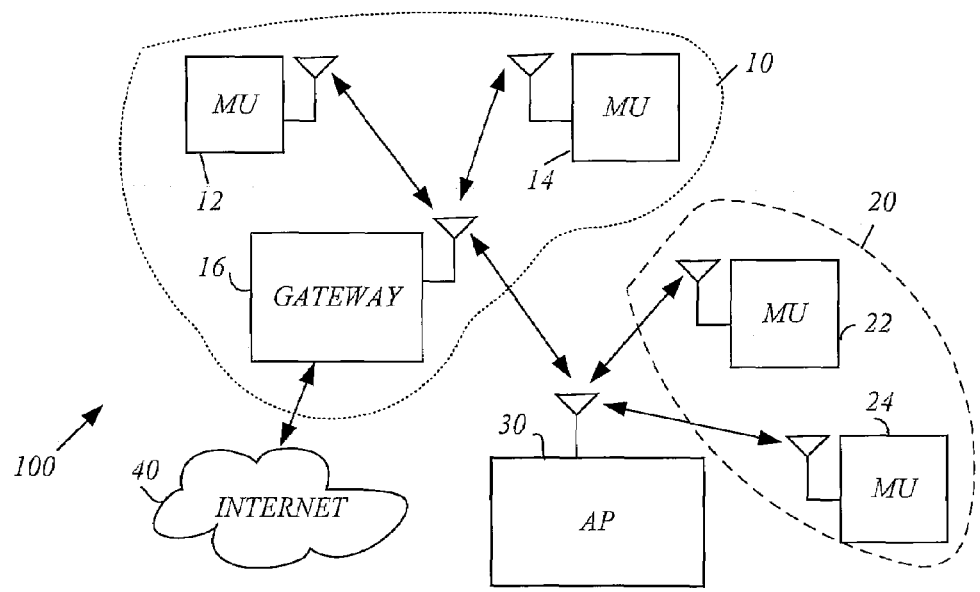
FIG. 1 is a schematic illustration of a wireless network according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile unites" describes two of more mobile units.

It should be understood that the present invention may be used in a variety of applications. Although the present invention is not limited in this respect, the circuits and techniques disclosed herein may be used in many apparatuses such as units of a wireless communication system. For example, a WLAN may include communication units to transact data between MU and AP. Units of WLAN communication system intended to be included within the scope of the present invention, include, by way of example only, MUs, APs, NICs, dual band NICs, a residential gateway (RG) and the like.

Types of WLANs intended to be within the scope of the present invention include, although are not limited to, WLANs that comply with "IEEE-Std 802 11, 1999 Edition" standard, and in addition "IEEE-Std 802 11b-1999 Supplement to 802.11-1999, Wireless LAN MAC and PHY specifications: Higher speed Physical Layer (PHY) extension in the 2.4 GHz band", IEEE-Std 802 11a-1999 Supplement to 802 11-1999, Wireless LAN MAC and PHY specifications: Higher speed Physical Layer (PHY) extension in the 5 GHz band" standard, and other supplement standards such as, for example, IEEE 802 11i, IEEE 802 11e and IEEE 802 11g and the like.

Turning first to FIG. 1, an example of a wireless local area network (WLAN) 100 in accordance with embodiments of the invention is shown. Although the scope of the present invention is not limited to this example, WLAN 100 may include a wireless network 10 that may operate in a frequency band of 2.4 GHz, for example, a wireless network that complies with IEEE-802 11b and/or IEEE-802.11g standard requirements. In addition, WLAN 100 may include a wireless network 20 that may operate in a frequency band of 5 GHz, for example, a wireless network that complies with IEEE-802.11a standard requirements. Furthermore, WLAN 100 may include an access point 30 and the Internet 40, if desired. Although the scope of the present invention is not limited in this respect, wireless network 10 may include mobile units (MU) 12, 14 and a gateway 16 which may incorporate an access point (AP), and wireless network 20 may include MUs 22 and 24.

In operation, AP 30 may include, for example, software applications that may operate with a personal computer (PC). In one embodiment of the invention, AP 30 may serve as an intermediate device of wireless networks 10 and 20. AP 30 may serve simultaneously as both an AP in wireless network 20 and as an MU in wireless network 10. In this embodiment, AP 30 may serve for a first predetermined time interval, for example, 90 milliseconds (ms), as an access point for MUs of wireless network 20 and in a second predetermined time interval for example, 10 ms, as an MU of wireless network 10. Furthermore, in another embodiment of the invention, AP 30 may be configured to work as a bridge and, under, such configuration, may connect MUs 22, 24 of wireless network 20 to Internet 40 through gateway 16.

Although the scope of the present invention is not limited in this respect, AP 30 may be configured to operate as a router and may incorporate a firewall capability. In this embodiment of the invention, gateway 16, for example a residential gateway (RG) that complies with IEEE-802 11b standard, may provide the MUs of wireless networks 10 and 20 with desired services, for example, a wired equivalent privacy (WEP) application for encryption and integrity checking. In alternate embodiments of the invention, AP 30 may be configured to operate with a more robust security suite, if desired. The security suite may be any security suite known to one skilled in the art such as, for example, authentication and key distribution based on IEEE Standard 802 1X-2001 with an associated authentication protocol and confidentiality and integrity suite. Additionally or alternatively, AP 30 may include a firewall module. If a firewall module is used, the firewall may provide protection from devices such as, for example, MUs 12 and 14, gateway 16, which operate in wireless network 10 and/or which might make use of the weak security in wireless network 10 in order to attack WLAN 100.

Additionally or alternatively, AP 30 may be configured to operate as both a bridge and a router. According to this alternative or additional feature, AP 30 may accept communications from MUs operating in wireless network 20 that use a WEP key for encryption as well as, but not limited to, communications of MUs that may use higher levels of encryption and secure authentication methods. Furthermore, AP 30 may operate as a bridge for relatively untrusted MUs and as a router and firewall for relatively trusted MUs, if desired.

Figure 2:
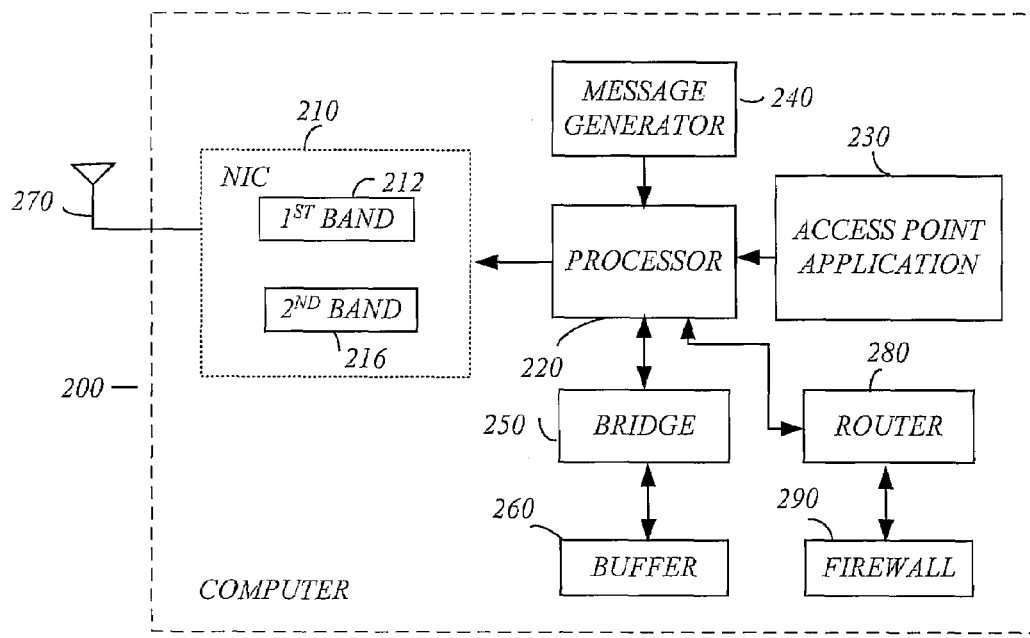
FIG. 2 is a schematic block diagram of a portion of a computer configured as an access point according to an exemplary embodiment of the present invention.

Turning now to FIG. 2, a schematic block diagram of an exemplary PC 200 that may be configured as an AP, for example AP 30, in accordance with embodiments of the invention is shown. Although the scope of the present invention is not limited to this example, PC 200 may include a dual band NIC 210, a processor 220, an access point (AP) application 230, a message generator 240, a bridge 250, a buffer 260, a router 280, a firewall 290 and an antenna 270, for example a dipole antenna and the like.

In operation, according to an embodiment of the present invention, PC 200 may be configured to operate both as an AP for wireless network 20 and as an MU for wireless network 10. PC 200 may be configured by executing AP application 230 on processor 220, if desired. In this configuration, processor 220 may control the operation of NIC 210.

Although the scope of the present invention is not limited in this respect, NIC 210, for example a dual band NIC that complies with both IEEE-802 11a and IEEE-802 11b standards, may include the capability to operate using a first frequency band 212 of 5 GHz and a second frequency band 216 of 2.4 GHz, if desired. Processor 220, for example, a reduced instruction set computer (RISC), a complex instruction set computer (CISC), and the like, may switch between NIC 210 bands in order to communicate with at least one of the wireless network 10 and/or 20.

Although the scope of the present invention is not limited in this respect, processor 220 may periodically switch between bands 212, 216 of NIC 210. For example, NIC 210 may transmit a transmission that includes a message on first band 212 to MUs 22, 24 of wireless network 20. The message may be generated by message generator 240 and may include an address, content, and a time interval. For example, the address may be the address of AP 30 or may contain no address of either one of the MUs of network 20; the content may be for example, an at least one of, a ready to send (RTS) command, a clear to send (CTS) command, and/or any other command and/or a null message, if desired. In addition, the time interval may be, for example, about 10 ms. The time interval may define a duration for which the MUs 22 and 24 may be instructed to cease transmissions, although the scope of the present invention is not limited in this respect.

Although, the scope of the present invention is not limited in this respect, the time interval may be adjusted according to the traffic load placed on wireless networks 10 and 20. For example, AP 30 may absent itself from wireless network 20 for periods that are long enough to switch to wireless network 10 and receive a beacon from gateway 16. In the event that the received beacon may indicate buffered communications for any of the AP and/or nodes 22 and 24, PC 200 may extend the absence period, e.g., by switching back to wireless network 20 and transmitting an additional message, in order to receive the communications and deliver them to the recipients if desired.

Although the scope of the present invention is not limited in this respect, NIC 210 may transmit the message to MUs 22, 24 of wireless network 20. MUs 22, 24 may include, for example, a mechanism known to one skilled in the art of IEEE-802 11 as a virtual carrier sense or network allocation vector, although the scope of the present invention is in no way limited in this respect. Upon receipt of the message, the virtual carrier sense of MUs 22, 24 may cause MUs 22, 24 to cease the transmissions to AP 30 for a predetermined time interval, according to instructions contained in the message. In the predetermined time interval during which the transmissions from MUs 22, 24 are halted, processor 220 may switch NIC 210 to second frequency band 216. Thus, AP 30 may communicate with gateway 16 and may download messages that had been buffered and stored at gateway 16 during the time that AP 30 was in communication with MUs 22, 24 of wireless network 20, if desired. In addition, the AP 30 may transmit to gateway 16 messages previously received from MUs 22 or 24 and buffered at AP 30, if desired.

Furthermore, while AP 30 may communicate with mobile units 22, 24 of wireless network 20, AP 30 may simulate for mobile units 12, 14 of wireless network 10 a standby mode and/or a power-saving mode. Thus, transmissions from MU 12, 14 and/or transmissions received from the Internet connection may be buffered at gateway 16. In one embodiment of the present invention, the method used by AP 30 may simulate a power saving mode, e.g., as defined in the IEEE 802 11 standard, for MUs 12, 14 of wireless network 10 and for gateway 16, although the invention is not limited in this respect.

Although the scope of the present invention is not limited in this respect, in alternative embodiments of the present invention, PC 200 may be configured to serve as bridge 250 between wireless network 10 and wireless 20. For example, in this configuration, processor 220 may be switched periodically between the bands of NIC 210 MUs 22 and 24 of wireless network 20 may be connected to Internet 40 through gateway 16. The communications from MUs 22, 24 may be buffered at buffer 260 and may be transmitted by bridge 250 to gateway 16, using NIC 210 and antenna 270.

Although the scope of the present invention is not limited in this respect, in another embodiment of the present invention, PC 200 may be configured as a router. In this embodiment, communications from MUs 22, 24 may be authenticated at firewall 290 and may be routed by router 280 to Internet 40. In this embodiment, it should be understood by one skilled in the art that it is not necessary for a firewall to be implemented in order for the router to be implemented.

Although the scope of the present invention is not limited in this respect, in another embodiment of the present invention, PC 200 may be configured to be both a router and a bridge. In this configuration, communications to and from gateway 16 and MUs 22, 24 may be authenticated at firewall 290, if implemented, and may be routed by router 280 to buffer 260 and bridge 250. Furthermore, in this embodiment PC 200 may permit firewall 290 to incorporate some higher levels of security such as, for example, a virtual private network (VPN), to allow communications of MUs with WEP encryption to access data that may be stored in a hard disk of PC 200, if desired.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of communicating in first and second wireless local area networks comprising:
    operating as an access point of the first wireless local area network, wherein the first wireless local area network is operating in a first frequency band;
    transmitting a message including one of a null message, a ready to send (RTS) or clear to send (CTS) command, over the first wireless local area network during a predetermined time interval, wherein the transmitting of the message causes stations of the first wireless local area network to refrain from transmitting during the predetermined time interval; and
    during said predetermined time interval, operating as a network bridge with a device of the second wireless local area network wherein the second wireless local area network is operating in a second frequency band.

2. The method of claim 1, further comprising:
    extending the predetermined time interval to enable communications with the device of the second wireless local area network.

3. The method of claim 1, further comprising:
    periodically transmitting the message, with a first time interval between transmissions, wherein the first time interval is based on an estimation of a second time interval of a beacon transmission of the second wireless local area network.

4. The method of claim 1, further comprising:
    buffering communications related to the device of the second wireless local area network while communicating with the device of the first wireless local area network.

5. The method of claim 1, further comprising:
    while operating as the access point of the first wireless local area network, simulating a standby or power saving mode with respect to at least one device of a second wireless local area network.

6. The method of claim 1, further comprising:
    broadcasting as the access point of the first wireless network a message to mobile units of the first wireless local area network containing a request to cease transmission for said predetermined time interval.

* * * * *